Figure 1:
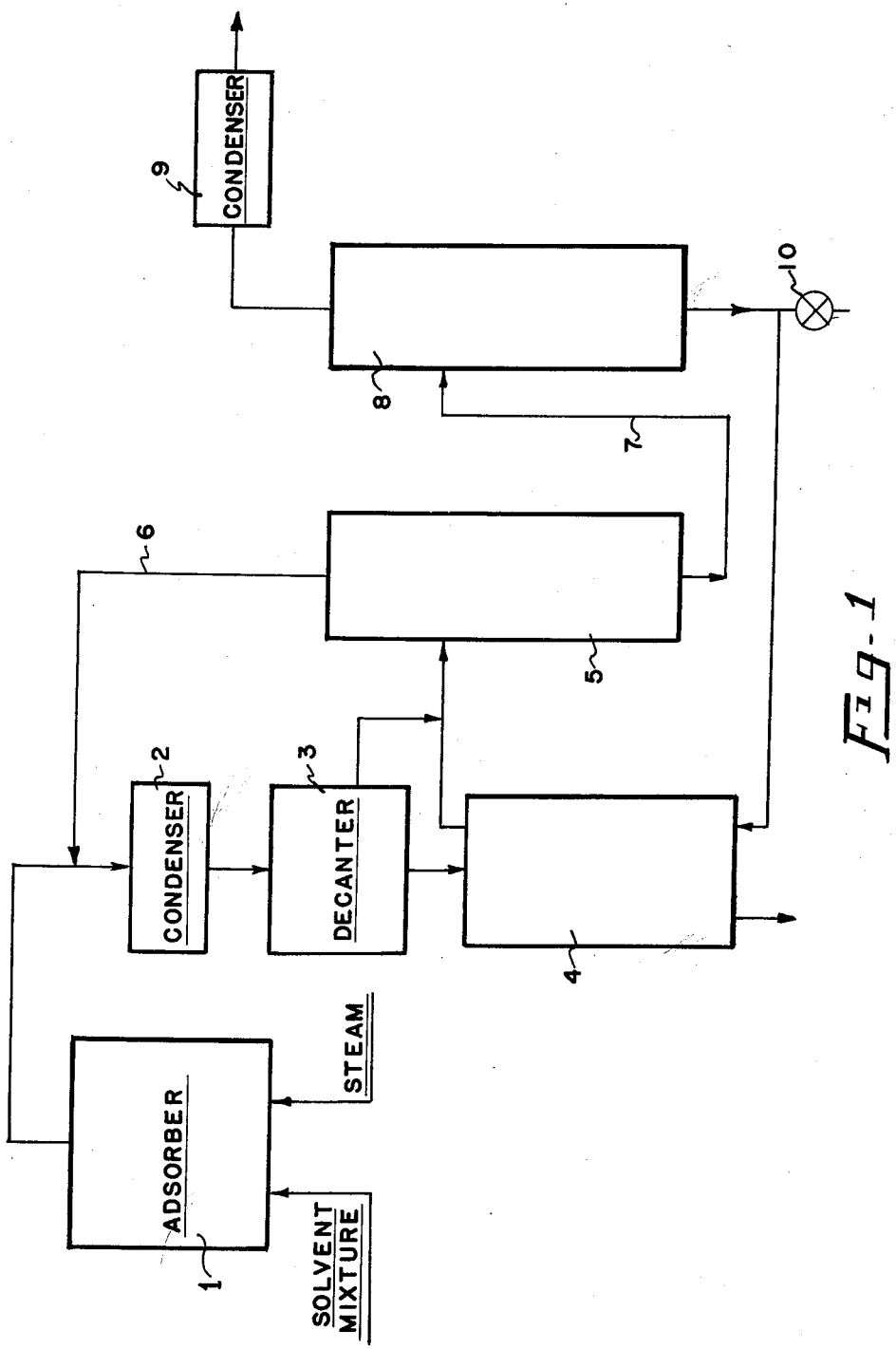

Jan. 22, 1963   H. W. HEMKER   3,074,968
METHOD OF SEPARATING A MIXTURE OF TETRAHYDROFURAN, TOLUENE
AND WATER
Filed June 3, 1960

3,074,968
METHOD OF SEPARATING A MIXTURE OF TETRAHYDROFURAN, TOLUENE AND WATER
Herman W. Hemker, West Chester, Pa., assignor to American Viscose Corporation, Philadelphia, Pa., a corporation of Delaware
Filed June 3, 1960, Ser. No. 33,666
3 Claims. (Cl. 260—346.1)

This invention relates to a method of separating a mixture of liquids. More particularly it relates to a continuous method for separating the components of a mixture containing azeotrope forming liquids and a selective solvent for one component of said azeotrope forming liquid.

In the coating of flexible sheets such as cellophane with vinylidene chloride copolymers and interpolymers, it is conventional to use a coating lacquer. The usual solvent or solvent-diluent mixture for the solid coating material consists of a mixture of tetrahydrofuran and toluene. It is extremely desirable for an economical commercial coating process to recover and reuse the coating lacquer solvents. It has been the practice to collect the solvent vapors from the coating dryer section in an adsorption system containing activated carbon. The solvent collected in the activated carbon adsorption system is flushed or stripped therefrom with steam and the three-component mixture condensed to a two phase system. This three component, two phase system consisting of water, tetrahydrofuran and toluene is difficult and commercially impractical to separate. Tetrahydrofuran forms an azeotrope with water so that separation of the water from the mixture by fractional distillation or stripping procedures is not practical.

It is an object of this invention to provide a method for separating the components of a mixture containing azeotrope forming liquids and a selective solvent for one component of the azeotrope forming liquids.

It is another object of this invention to provide a method for separating a three-component mixture containing water and a water azeotrope-forming liquid.

It is a further object of this invention to provide a less expensive, continuous method of separating water from a three-component liquid mixture and to supply a dry recycled solvent to be used in the separation process.

In accordance with the present invention a method for separating the components of a mixture containing azeotrope forming liquids and a selective solvent for one component of said azeotrope forming liquids comprises (1) separating said mixture into two layers, one of which is rich in an azeotrope forming liquid and the other of which is rich in a solvent-solute mixture, (2) subjecting the layer containing azeotrope forming liquids to counter current extraction using the selective solvent of the mixture as the extracting medium, (3) distilling the extract phase from the counter current extraction to remove the azeotrope, (4) distilling the remaining layer to remove azeotrope, and (5) distilling the bottoms from both prior distillations to separate the remaining components of the mixture. Continuity of the process described herein is facilitated by recycling the selective solvent separated from the last distilling step and using this hydrocarbon solvent as the extracting solvent for the counter current extraction step of this procedure.

An additional feature is also included in the invention. It is contemplated that the overhead vapor from the first distillation step which contains a major proportion of azeotrope is recycled back to the original mixture.

The invention will be more readily understood with reference to the accompanying drawing in which the single FIGURE is a schematic representation of the process of this invention.

The exhaust vapors from a coating operation rich in tetrahydrofuran and toluene with a small amount of water vapor are collected in the activated carbon adsorption system 1. This adsorption system is flushed with steam and the water-tetrahydrofuran-toluene vaporous is condensed at 2 and the liquid mixture allowed to settle and form top and bottom layers in decanter 3. The lower layer rich in water with tetrahydrofuran and a small amount of toluene is passed through counter current extractor 4 in direct counter current relationship with toluene as the extraction solvent. The tetrahydrofuran and toluene which have a greater affinity for the toluene solvent than for water are carried upwardly as a solute in the toluene and the extract phase of toluene and tetrahydrofuran with a small amount of water passes to the water stripper 5. Water in the extractor passes off at the bottom.

The upper layer from decanter 3 which is rich in tetrahydrofuran and toluene in a solute-solvent system with a small amount of water is also sent to water stripper 5. The mixture in water stripper or distillation unit 5 is then distilled to remove the remaining water as the tetrahydrofuran azeotrope. The overhead azeotrope vapor is recycled back to the original mixture through line 6 and the bottoms from stripper 5 are continuously passed through line 7 to tetrahydrofuran stripper 8 wherein tetrahydrofuran is distilled from the toluene. It is removed as overhead vapor from stripper 8, condensed at 9 and recovered for reuse as a solvent for a coating lacquer. The bottoms from the stripper 8 which is pure toluene is, in accordance with the preferred method of this invention, recycled to the counter current extractor 4 to be used as the extraction solvent, thus completing and facilitating a very effective continuous method for separating and obtaining pure tetrahydrofuran and toluene. After a period of operation any excess separated toluene is drawn off at 10 to be used as a solvent diluent.

It is contemplated that the method disclosed herein is applicable to other mixtures of liquids wherein several components are capable of forming an azeotrope and another component is a selective solvent for one of the azeotrope forming components.

Various changes and modifications may be made in practicing the invention without departing from the spirit and scope thereof and, therefore, the invention is not to be limited except as defined in the appended claims.

I claim:
1. A continuous method of separating a mixture containing water, tetrahydrofuran, and toluene which comprises (1) separating the mixture into a top layer rich in tetrahydrofuran and toluene and a bottom layer rich in water with tetrahydrofuran, (2) subjecting the bottom layer to counter current extraction utilizing toluene as the extraction medium, (3) distilling the extraction phase from said counter current extraction to remove water tetrahydrofuran azeotrope, (4) distilling said top layer in the same distillation procedure as used for said extraction phase to remove water tetrahydrofuran azeotrope, and (5) distilling the bottoms from said distillation procedure to separate tetrahydrofuran as the overhead fraction and toluene as the bottoms.

2. The method of claim 1 having the additional step of recycling the toluene bottoms from the second distillation procedure and using it as the extracting medium in said counter current extraction step.

3. The continuous method for separating tetrahydrofuran and toluene from an aqueous mixture containing the same which comprises (1) separating the mixture into a top layer rich in tetrahydrofuran and toluene and a bottom layer rich in water with tetrahydrofuran, (2) subjecting said bottom layer to a counter current extraction procedure wherein toluene is used as the extracting medium, (3) distilling the extract phase from the counter current extraction to remove water tetrahydrofuran azeotrope, (4) distilling said top layer in the same distillation procedure used for said extract phase to remove water tetrahydrofuran azeotrope, (5) recycling the overhead from the distillation back to the original mixture, (6) distilling the bottoms from said distillation step to condense and recover the tetrahydrofuran overhead vapor and (7) recycling the toluene bottoms and using it as the extracting medium in the counter current extraction step.

References Cited in the file of this patent

UNITED STATES PATENTS 2,404,163    Carpenter et al. _____ July 16, 1946